Patented Nov. 9, 1937

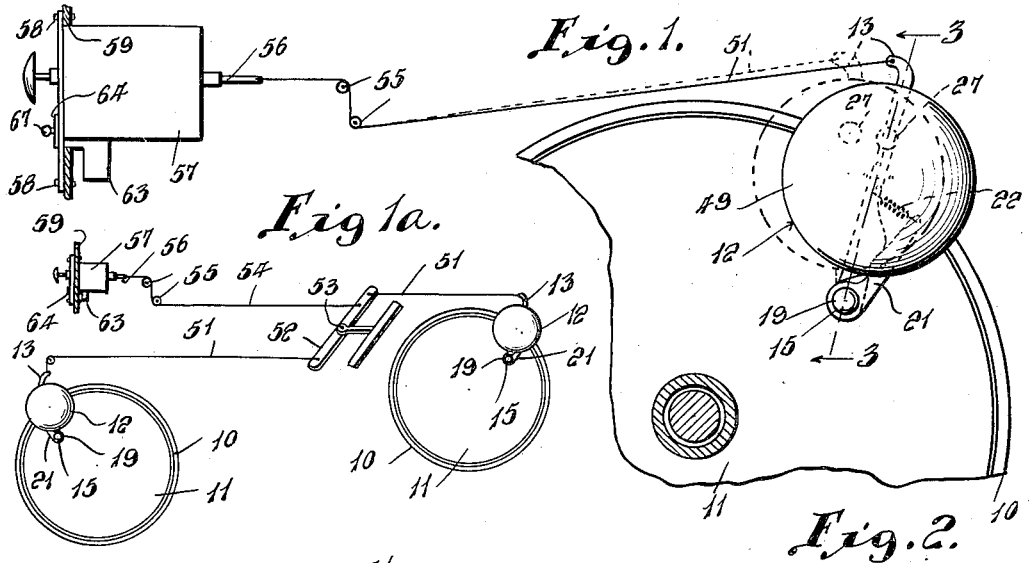
Nov. 9, 1937. W. H. BLANEY 2,098,854
AUTOMOBILE THEFT PREVENTER
Filed Sept. 10, 1936 2 Sheets-Sheet 1
Inventor
William H. Blaney

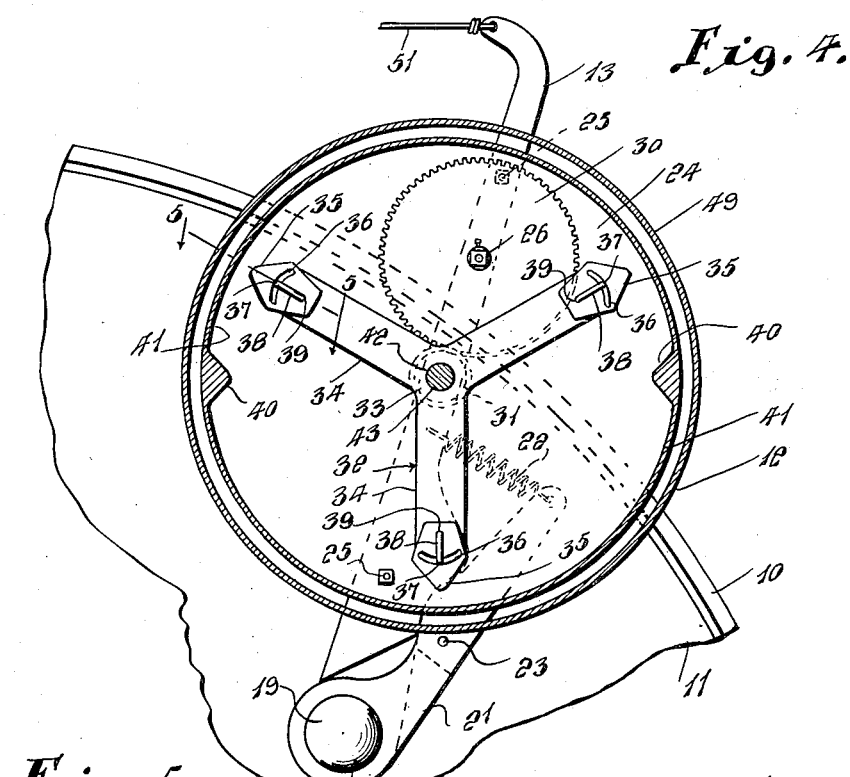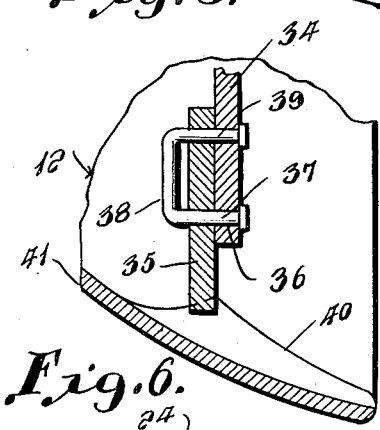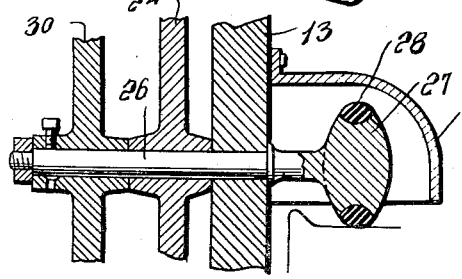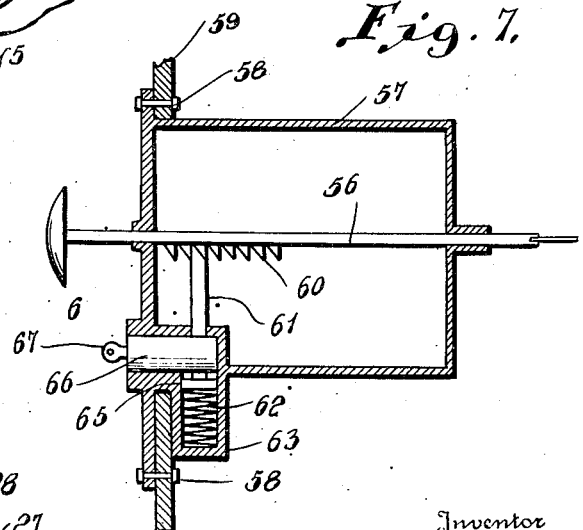

2,098,854

UNITED STATES PATENT OFFICE 2,098,854

AUTOMOBILE THEFT PREVENTER

William H. Blaney, Dallas, Tex.

Application September 10, 1936, Serial No. 100,202

4 Claims. (Cl. 116—61)

This invention relates to a means to prevent theft of an automobile and it aims to provide a novel construction which will act as an audible tell-tale or alarm in the event of unauthorized operation of the vehicle by anyone other than the owner or lawful operator, either when the vehicle is driven in the normal manner or is towed with either the front end or the rear end elevated, or when said vehicle is parked and is moved either forwardly or backwardly from the parked position, by another vehicle pushing the parked vehicle either forwardly or backwardly as the case may be.

It is especially aimed to provide a novel construction which may be operated without the use of a key to apply an operating member against a rotating part of a wheel, preferably both a front and a rear wheel, for operation through turning of such wheel or wheels, and which device will require a key or similar operation on the part of the owner to restore the device to inoperative or normal position.

The more specific objects and advantages will become apparent from a consideration of the description following taken in connection with accompanying drawings illustrating an operative embodiment.

In said drawings:—

Figure 1 is a view partly in section showing the invention applied to an automobile;

Figure 1a is a diagrammatic view showing the application of the invention to an automobile;

Figure 2 is a side elevation showing the audible signal and its mounting;

Figure 3 is an enlarged sectional view taken on the line 3—3 of Figure 1;

Figure 4 is a sectional view taken on the line 4—4 of Figure 3;

Figure 5 is an enlarged sectional view taken on the line 5—5 of Figure 4;

Figure 6 is a detail taken on the same plane as Figure 3 showing the drive for the audible signal; and Figure 7 is an enlarged vertical section through the control box structure employed.

Referring specifically to the drawings, wherein like reference characters designate like or similar parts, rotatable brake drum housings are shown at 10 moving with respect to stationary brake supports or plates 11. It will be understood that these parts are conventional as used on all automobiles or similar vehicles for both front and rear wheels.

In carrying out the invention, an audible signal device 12 may be used in connection with each of the four wheels of the vehicle. However, only one may be used but it is preferred to employ one on one front wheel and one on one opposite rear wheel of the vehicle, as suggested in Figure 1a so that the device will operate not only for forward and backward movement but in the event it is being towed with either the front wheels or the rear wheels elevated.

Each audible signal device comprises a lever or arm 13 journaled on a cylindrical portion 14 of a bolt 15. Said bolt has a tapered portion 16 wedged in a tapered opening in the support 11 and secured in place by a screw shank 17 and nut 18 thereon. Such bolt 15 also has a head 19 and between the latter and cylindrical portion 14, has a polygonal portion 20, intimately fitting a correspondingly shaped opening in a fixed arm 21. A contractile coil spring 22 is fastened to the arms 13 and 21, serving to urge the arm 13, to retracted position against the arm or abutment 21, the latter having a pin or the like at 23, limiting the retraction of arm 13.

A base plate or disk 24 is bolted as at 25 to the arm or lever 13 and in both of them, a shaft 26 is journaled, such shaft having a wheel 27 thereon provided with a traction ring 28 of cloth, rubber, or other material adapted to be moved into and out of engagement with the exterior of the brake drum housing, a guard 29 being fastened to the lever 13 to protect such wheel 27 against undue entrance of dirt and foreign matter. On the shaft 26, a gear wheel 30 is keyed which meshes with a gear wheel 31 forming part of a striker 32 in the form of a spider, having a hub 33 and radiating arms 34. On the outer ends of said arms 34 are movable striker members 35. The members 35 have arcuate slots 36 through which one end portion 37 of U-shape fastenings 38 pass, the other end or arm 39 of such fastenings passing through the striker members 35 and arms 34 to pivotally mount the striker members. Said striker members 35 are adapted during rotation of the arms 34, to engage lobes or projections 40 on the interior of a bell body 41. A stationary central bolt or arbor 42 has reduced portions 43, 44, and 45, the portions 44 and 45 extending through the base 24 and lever 13 and beyond the same being held in place by a nut 46 screwed on the portion 45. Gear wheel 31 and hub 33 are journaled on the portion 44 and 43, respectively, and on the part 42 a head 47 is provided, mounting screws 48 which pass through the bell body 41 and into screw-threaded openings of a cover 49 conforming substantially to the shape of the bell body 41 and extending over the periphery of the base 24. It will be noted that projections 50 are provided on both the inside and outside of the bell body 41, projections 51 are provided on the inside of the housing 49 and projections 52 are provided on the other face of the head 47. Such projections 50, 51, and 52, it will be noted, have a minimum surface area although firm contact with each other, so as not to interfere with the ringing or audibility of the bell body 41.

As shown in Figure 1 the parts described are normally in the full line position and since the bolt 15 is mounted eccentrically with respect to the axis of rotation of the brake drum housing, the arm 13 may be pulled forwardly to the dotted line position, also shown in Figure 1 so that the wheel 27 contacts with the brake drum housing and will be rotated by the brake drum housing, if the vehicle is thereafter operated, resulting in the gearing driving the striker and consequently moving the striker element 35 against the projections 40 to operate the bell.

Suitable means are provided whereby said arm or lever 13 and parts carried thereby are drawn or applied to the dotted line position of Figure 1. To this end, a wire or other flexible draw element 51 is fastened to the free end of the lever 13. Where two of the devices are used as in Figure 1a, the flexible elements 51 are attached to opposite ends of an equalizing bar 52 pivoted on a vertical axis at 53 to a suitable fixed part of the automobile or vehicle. Between the connections of the elements 51 to the equalizer bar 52, a draw element 54 is attached, passing over suitable guide pulleys or the like at 55 and being connected to a pull rod 56. In cases where a single audible device 12 is used, the wire 54 is connected directly to the lever arm 13.

Said pull rod 56 is slidably mounted in a suitable housing or casing 57 attached for instance by bolts or the like at 58 to the instrument board 59 of a vehicle or automobile.

A series of teeth 60 are provided on the pull rod 56 having their forward walls vertical and their rear walls inclined as best shown in Figure 7. A vertically slidable latch rod 61 whose upper end corresponds in shape to the space between the teeth, is carried by the casing 57 and urged upwardly by an expansion spring 62 mounted in an arm 63 of an L-shaped housing 64 forming part of the casing 57. In the other arm 65 of such housing 64, a cylinder lock 66 is fastened, being operable by its key 67, to cause the pin or latch 61 to lower through any suitable connection therewith, against the tension of the spring 62.

As a result of the construction described, the pull rod 56 may be pulled rearwardly in order to apply the device by moving the lever and attached parts 13 forwardly and engaging the wheel 27 with the periphery of the brake drum 10, the pin 61 automatically engaging the teeth 60 to hold the pull rod and the parts in the applied position. No key is necessary therefore to apply the device, but in order to release it, the owner or other authorized person having the key 67 must use it in order to retract the latch 61 and thus permit restoration of the parts to the normal position through the contractile action of spring 22.

Various changes may be resorted to provided they fall within the spirit and scope of the invention.

What is claimed is:—

1. A device of the class described comprising a fixed support and a rotatable part surrounding the same, a lever movable in a path in parallelism to the fixed support, an audible signal carried and supported only by the lever having a part engageable with said rotatable part through operation of the lever, a bolt securing the lever to the fixed support, said lever being pivoted on said bolt, an arm held in fixed position by said bolt, and a contractile spring between said lever and said arm.

2. A device of the class described comprising a fixed support and a rotatable part surrounding the same, a lever movable in a path in parallelism to the fixed support, an audible signal carried and supported only by the lever having a part engageable with said rotatable part through operation of the lever, a bolt securing the lever to the fixed support, said lever being pivoted on said bolt, an arm held in fixed position by said bolt, a contractile spring between said lever and said arm, said bolt having a polygonal portion intimately fitting an opening in said arm, and a conical attaching portion on said bolt.

3. An audible signal device of the class described comprising a lever, a base carried thereby, a bolt member secured to the lever and base, a bell carried by and supported only on the bolt member, a shaft journaled on said lever and base and applicable for operation by a moving part of a vehicle through movement of the lever, a clapper rotatably mounted on said bolt member, gearing to operate the clapper disposed and mounted intermediate said shaft and bolt member, and a projection on said bell for engagement by the clapper.

4. An audible signal device of the class described comprising a lever, a base carried thereby, a bolt member connected to the base, a bell carried by the bolt member, a shaft applicable for operation by a moving part of a vehicle through movement of the lever, a clapper journaled on said bolt, gearing to operate the clapper disposed and mounted intermediate said shaft and bolt, said clapper coacting with said bell, said bell having an enlargement, and said clapper having arms, clapper members pivoted to the arms, said clapper members having arcuate slots and the pivots for said arms having portions engaged in said slots, a head on said bolt, a housing over said bell body, and projections on the head, bell body and housing preventing undue muffling of the bell body, and fastenings extending from the head through said projections and mounting the housing.

WILLIAM H. BLANEY.